United States Patent
Gussen et al.

(10) Patent No.: US 10,358,173 B2
(45) Date of Patent: Jul. 23, 2019

(54) DEVICE AND METHOD FOR SUBDIVIDING VEHICLE CAB AND/OR STORAGE SPACE INTO A NUMBER OF SUB-PORTIONS

(71) Applicant: Ford Global Technologies, LLC, Dearborn, MI (US)

(72) Inventors: Uwe Gussen, Huertgenwald (DE); Christoph Arndt, Moerlen (DE); Frederic Stefan, Aachen (DE); Frank Petri, Erftstadt (DE)

(73) Assignee: Ford Global Technologies, LLC, Dearborn, MI (US)

(*) Notice: Subject to any disclaimer, the term of this patent is extended or adjusted under 35 U.S.C. 154(b) by 173 days.

(21) Appl. No.: 15/673,665

(22) Filed: Aug. 10, 2017

(65) Prior Publication Data

US 2018/0050740 A1 Feb. 22, 2018

(30) Foreign Application Priority Data

Aug. 17, 2016 (DE) .................. 10 2016 215 405

(51) Int. Cl.
| | |
|---|---|
| *B62D 33/04* | (2006.01) |
| *B60R 21/02* | (2006.01) |
| *B60R 5/04* | (2006.01) |
| *B60P 3/20* | (2006.01) |

(52) U.S. Cl.
CPC .......... *B62D 33/042* (2013.01); *B60R 21/026* (2013.01); *B60P 3/205* (2013.01); *B60R 5/047* (2013.01); *B60R 5/048* (2013.01); *B60R 2021/0266* (2013.01)

(58) Field of Classification Search
CPC ....... B62D 33/042; B60P 3/205; B60R 5/047; B60R 5/048
USPC ................. 296/24.46, 24.43, 24.4
See application file for complete search history.

(56) References Cited

U.S. PATENT DOCUMENTS

| | | | | |
|---|---|---|---|---|
| 3,423,121 A | * | 1/1969 | Lipkin | B60R 21/06 160/229.1 |
| 3,638,450 A | * | 2/1972 | Falk | B60P 3/205 160/23.1 |
| 3,643,972 A | * | 2/1972 | Caiati | B60R 21/06 280/749 |
| 4,639,031 A | * | 1/1987 | Truckenbrodt | B60P 3/205 160/84.01 |
| 6,003,920 A | * | 12/1999 | Crisp | B60R 5/047 160/265 |
| 6,491,332 B2 | * | 12/2002 | De Ceuster | B60R 5/047 160/24 |
| 7,537,257 B2 | * | 5/2009 | Watanabe | B60R 7/04 296/24.46 |

(Continued)

*Primary Examiner* — Jason S Morrow
(74) *Attorney, Agent, or Firm* — Vichit Chea; Price Heneveld LLP

(57) ABSTRACT

A device for subdividing vehicle cabs and/or storage spaces into a number of sub-portions, comprising a number of deformable walls and a drive unit for moving the walls between an open position, in which the walls do not subdivide the cab and/or the storage space, and a closure position, in which the walls subdivide the cab and/or the storage space into the sub-portions. The walls become deformed during movement between the closure position and the open position. Also included is a method for subdividing vehicle cabs and/or storage spaces into a number of sub-portions and a vehicle.

13 Claims, 3 Drawing Sheets

(56) References Cited

U.S. PATENT DOCUMENTS

| | | | | |
|---|---|---|---|---|
| 7,703,803 B2* | 4/2010 | Ekberg | ............... | B60R 21/06 |
| | | | | 280/748 |
| 9,469,237 B2* | 10/2016 | Lee | ............... | B62D 33/042 |
| 2002/0135198 A1* | 9/2002 | De Ceuster | ............... | B60R 5/047 |
| | | | | 296/100.11 |
| 2004/0107712 A1* | 6/2004 | Moran | ............... | B60P 3/205 |
| | | | | 62/177 |
| 2018/0001750 A1* | 1/2018 | Miller | ............... | B60P 3/205 |

* cited by examiner

DEVICE AND METHOD FOR SUBDIVIDING VEHICLE CAB AND/OR STORAGE SPACE INTO A NUMBER OF SUB-PORTIONS

FIELD OF THE INVENTION

The present invention generally relates to a device and method for subdividing vehicle cabs and/or storage spaces into a number of sub-portions, and further relates to a vehicle having such a device which is operated with the method.

BACKGROUND OF THE INVENTION

During temperature control of cabs and/or storage spaces of vehicles, aircraft, trains, ships and/or the like, the energy consumption which is caused by the air conditioning units used for this purpose is very high, particularly when the temperature differences between the internal temperature and the external temperature are particularly great. Depending on the load being transported, it may further be necessary also to cool the load down to a relatively low temperature level, which typically results in a high energy consumption, particularly in the case of high external temperatures. In the case of air conditioning systems which are supplied with electricity, as a result of the high energy consumption the discharge operation of batteries which store the electrical energy for the air conditioning units is accelerated. If internal combustion engines are used for propulsion, the batteries can be charged again, but this results in increased fuel consumption. The accelerated discharge operation of the batteries as a result of the energy consumption which occurs during temperature control results in a reduction of the range of the vehicle. Particularly in the case of electric vehicles, the range is typically a decisive factor for their market acceptance which is a decisive prerequisite for the fact that electric vehicles can become established on the market and can make a contribution to the reduction of the pollutant emissions caused by traffic, for example, $CO_2$ and nitrogen oxide emissions.

In many cases, however, it is necessary to control the temperature of the entire cab and/or the storage space, particularly when the cab is only partially occupied. For example, in the case of station wagons or SUVs, the storage space is not spatially separated from the cab so that, for example, when the driver is the only occupant of such a vehicle, a substantially greater volume of air, that is to say, the entire air located in the cab and the storage space, has its temperature controlled for the well-being of the driver. As a result of the high volume of the air to be temperature-controlled, the temperature control takes a comparatively long time.

It would be desirable to provide a device with which the energy consumption during temperature control of cabs and/or storage spaces in particular of a vehicle can be reduced with respect to known vehicles.

SUMMARY OF THE INVENTION

According to one aspect of the present invention, a device for subdividing a vehicle cab and/or storage space into a number of sub-portions is provided. The device includes one or more deformable walls, and a drive unit for moving the one or more deformable walls between an open position, in which the walls do not subdivide the cab and/or the storage space, and a closure position, in which the walls subdivide the cab and/or the storage space into the sub-portions, wherein the walls become deformed during movement between the closure position and the open position.

According to another aspect of the present invention, a device for subdividing space in a vehicle into sub-portions is provided. The device includes a deformable wall, and a drive unit for moving the deformable wall between an open position in which the walls do not subdivide the space and a closure position in which the wall subdivide the space, wherein the wall becomes deformed during movement between the closure position and the open position.

According to yet another aspect of the present invention, a method for subdividing a vehicle cab and/or a storage space into a number of sub-portions is provided. The method includes the steps of providing one or more deformable walls, and moving one or more deformable walls with a drive unit between an open position in which the walls do not subdivide the cab and/or the storage space, and a closure position, in which the walls subdivide the cab and/or the storage space into the sub-portions, wherein the walls become deformed during movement between the closure position and the open position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
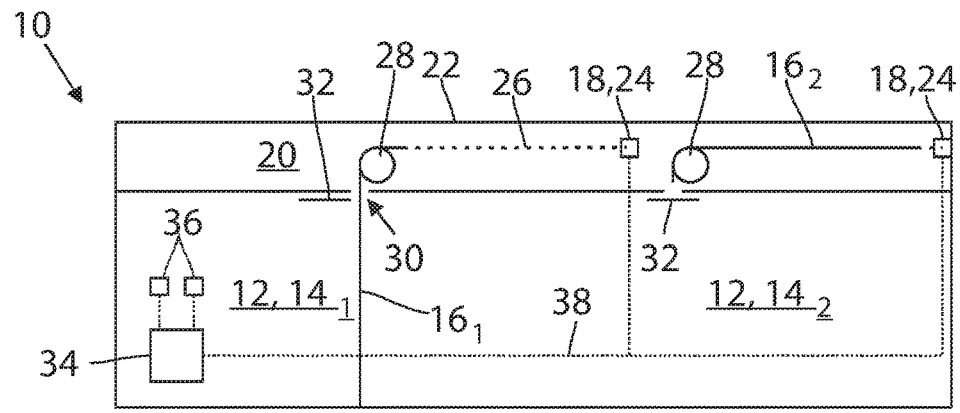
FIG. 1 is a is a schematic diagram illustrating a first embodiment of a device for subdividing vehicle cabs and/or storage spaces into a number of sub-portions.

FIG. 1 is a schematic view of a first embodiment of a device 10 according to one embodiment, with which a cab 12 and/or a storage space 12 can be subdivided into a number of sub-portions 14. In the embodiment illustrated, the cab 12 of a vehicle which is not illustrated in greater detail and which may be constructed as an SUV or station wagon is intended to be involved. The term "cab" is usually used for enclosed spaces in which persons can be located while a storage space 12 is used to receive goods, wherein the transition is fluid since goods are also transported in the cab 12. In the case of vehicle configured as SUVs or station wagons, the cab 12 merges seamlessly into the storage space 12 so that a strict separation between the cab 12 and the storage space 12 is not possible. Therefore, there is no illustration of the distinction.

The device 10 according to one embodiment comprises in this case a deformable first wall 16₁ and a deformable second wall $16_2$ which are produced from bendable glass. The device 10 according to the embodiment shown further comprises a drive unit 18, with which the walls $16_1$, $16_2$ can be moved between an open position and a closure position. The first wall $16_1$ is in the closure position, in which it subdivides the cab 12 and/or the storage space 12 into a first sub-portion $14_1$ and a second sub-portion $14_2$. The second wall $16_1$ is in the open position, in which it does not subdivide the cab 12 into additional sub-portions 14. The drive unit 18 is in a receiving portion 20 which is arranged in a hollow space of a roof 22 of the vehicle in the example illustrated. The drive unit 18 may have a servomotor 24, for example, an electric motor, with which a sheathed cable 26 can be rolled up on a winch (not illustrated) and unrolled therefrom again, whereby the walls 16 are moved between the open position and the closure position.

As can be seen in FIG. 1, the receiving portion 20 extends over the roof 22 of the vehicle, whereas the wall 16 extends approximately perpendicularly thereto in the closure position. In order to be able to introduce the walls 16 in the open position into the receiving portion 20, the device 10 has a number of rollers 28 which cooperate with the walls 16 in such a manner that they are bent through an angle, in this embodiment through about ninety degrees (90°), during movement between the open position and the closure position. Consequently, the hollow space which is available in the roof 22 can be used to receive the walls 16 in the open position so that the device 10 according to the embodiment shown takes up no structural space or only a very small amount of additional structural space.

The roof 22 has openings 30 which are passed through by the walls 16 during movement into the closure position. The device 10 has flaps 32 with which the openings 30 can be closed if the wall 16 is in the open position. The optical property of the cab and/or the storage space 12 is therefore not influenced or is influenced only to a negligible extent in particular when the walls 16 are in the open position.

The device 10 further comprises a control unit 34 and a number of sensors 36 which record data which characterize the state of the cab, the storage space 12 and/or the vehicle, convert the data into corresponding signals and transmit the signal to the control unit 34. The data which characterize the state of the cab 12, the storage space 12 and/or the vehicle may be, for example, the actual and the desired temperature in the cab, the external temperature, the number of persons in the cab 12, the charging state of the battery of the electric vehicle, the amount of fuel still left in the tank and/or the distance to the destination input via a navigation system. Depending on which values these data take up, the control unit 34 controls the drive unit 18, whereby the walls 16 are moved between the closure position and the open position. In the first embodiment, the control unit 34 has moved only the first wall 16 into the closure position, whereas the second wall 16 has been left in the open position. The transmission of the signals between the control unit 34, the sensors 36 and the drive unit 18 is brought about via electrical lines 38. The presence of the control unit 34 does not exclude the possibility that the passengers can move one or more walls 16 as desired into the closure position or the open position, for example, by actuating a button or by selecting a corresponding menu option of the onboard computer.

Figure 2:
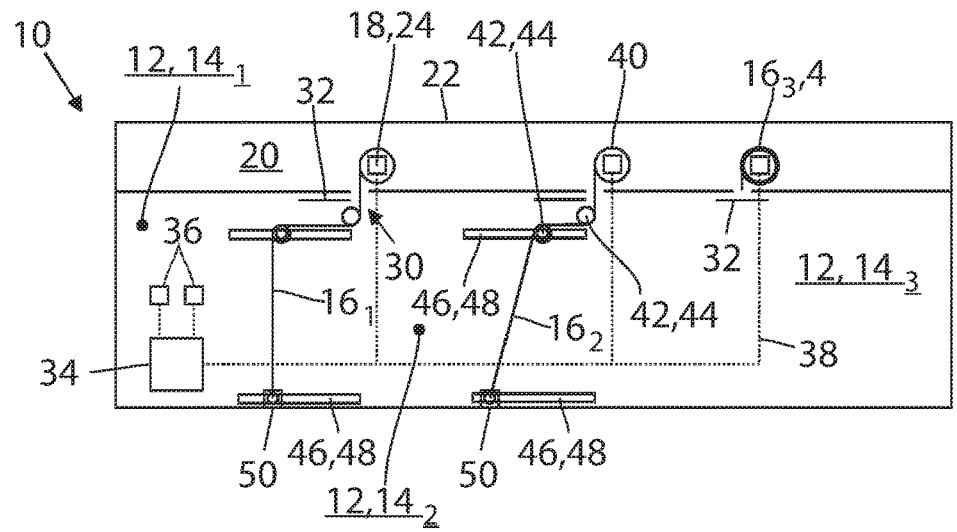
FIG. 2 is a schematic diagram illustrating a second embodiment of the device for subdividing vehicle cabs and/or storage spaces into a number of sub-portion.

FIG. 2 is also a schematic illustration of a second embodiment of the device 10. The receiving portion 20 is again located in the roof 22 of the cab. In this embodiment, the device 10 comprises three walls $16_1$ to $16_3$. Unlike the first embodiment, the drive unit 18 has one rotatable shaft 40 per wall 16, on which the walls 16 can be rolled up or from which the walls 16 can be unrolled. The third wall $16_3$ is completely rolled up on the shaft 40 and is therefore located in the open position. The device 10 further has a guide device 42 with which the first wall and second wall $16_1$, $16_2$ can be guided inside the cab and/or the storage space 12. In the second embodiment illustrated, the guide device 42 comprises for this purpose two redirecting rollers 44 which can again be adjusted with an adjustment device 46 in terms of the position thereof. The adjustment device 46 has rails 48, along which the redirecting rollers 44 can be displaced. In the example illustrated, the device 10 further comprises a closure device 50, with which the first and second walls $16_1$, $16_2$ can be fixed in the closure position. The closure device 50 is also supported on rails 48, along which it can be displaced. It is thereby possible to adapt the walls 16 very flexibly to the spatial circumstances inside the cab and/or the storage space 12. Whereas the first wall $16_1$ extends approximately perpendicularly inside the cab 12, the second wall $16_2$ extends so as to be inclined at a specific angle to the perpendicular. For example, an object, such as a seat, can be bypassed with the inclination selected.

Figure 3:
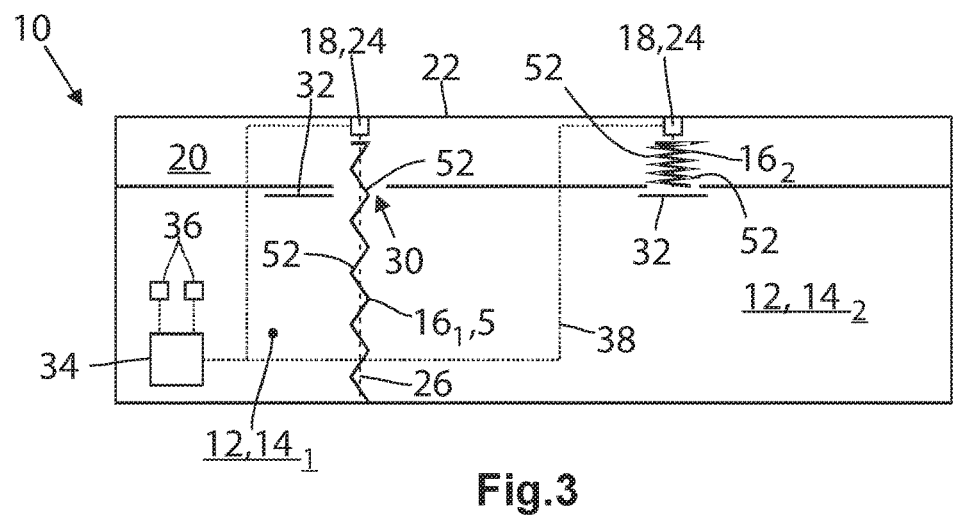
FIG. 3 is a schematic diagram illustrating a third embodiment of the device for subdividing cabs and/or storage spaces into a number of sub-portions.

FIG. 3 is another schematic illustration of a third embodiment of the device 10. In this case, the walls $16_1$, $16_2$ comprise a foldable glass. The walls 16 are subdivided by folding edges 52 into a corresponding number of segments. Consequently, the walls 16 can be moved similarly to a blind between the open position and the closure position. To this end, the sheathed cable 26 is connected to the free end of the wall 16. If the sheathed cable 26 is pulled by the drive unit 18, the segments of the wall 16 fold together, as is the case in the second wall $16_2$. In order to be able to move the wall 16 from the open position into the closure position, the sheathed cable 26 simply has to be relaxed. In order to ensure that the wall 16 also moves in the direction of the closure position, it may have a weighted piece which is not illustrated and which is fixed to the free end. Alternatively, there may be provided an additional sheathed cable 26 which is also not illustrated and which is guided in such a manner that it moves the wall 16 in the direction of the closure position when it is pulled.

Figure 4:
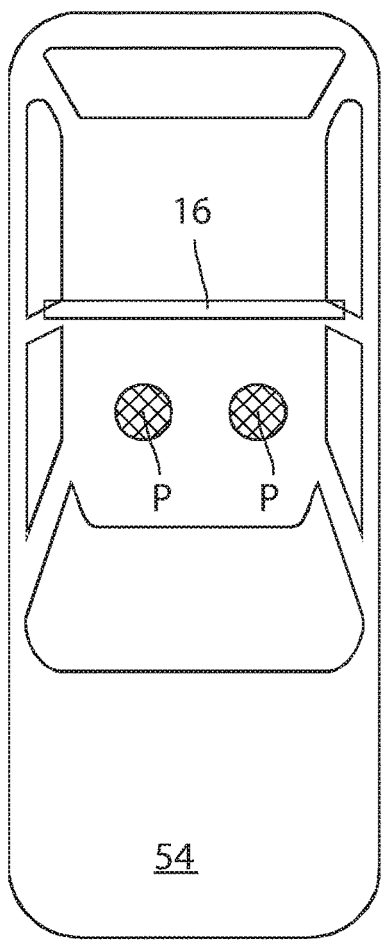
FIG. 4 is a top view of a vehicle illustrating one example of a selected sub-portion of the vehicle.
Figure 5:
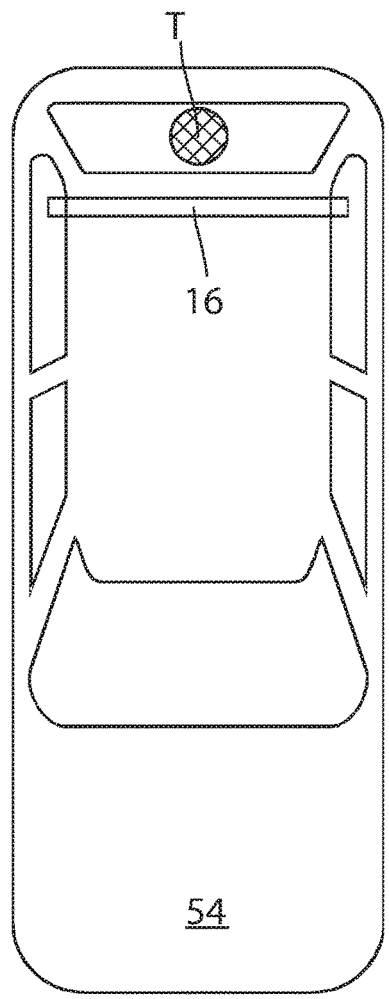
FIG. 5 is a top view of a vehicle illustrating another example of a selected sub-portion of the vehicle.
Figure 6:
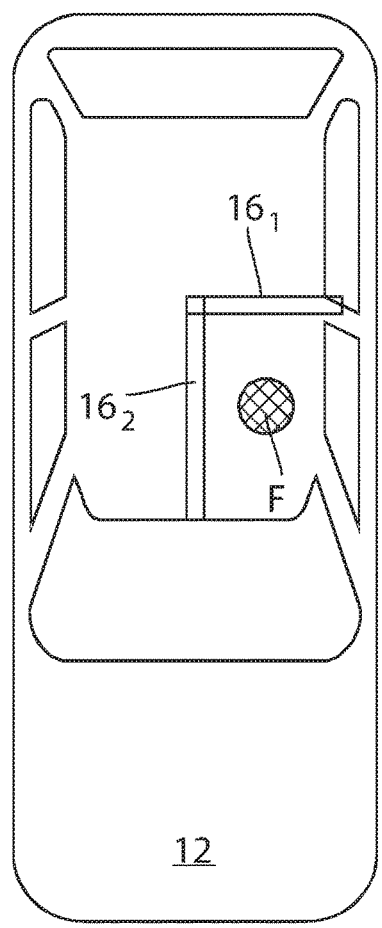
FIG. 6 is a top view of a vehicle illustrating a further example of a selected sub-portion of the vehicle.

FIGS. 4-6 are schematic plan views of a vehicle 54, the cab of which has been subdivided into sub-portions 14 of different sizes by means of a device 10 according to the proposal which is not shown in greater detail. It is intended to be assumed that the vehicle 54 is an SUV or a station wagon in the example shown which has a front and a rear row of seats (not illustrated).

In FIG. 4, the vehicle 54 is occupied by two persons P who are seated on the seats of the front row of seats. Consequently, the wall 16 which is located directly behind the front row of seats has been moved into the closure position, at the instigation of the control unit 34 which is not illustrated here, in order to minimize the volume of the sub-portion in which the persons P are located.

In FIG. 5, a domestic animal T, for example, a dog, is located in the storage space 12. In this case, the wall 16 which is located behind the rear row of seats has been moved into the closure position, whereby odors which have been isolated from the dog are intended to be prevented from being able to be transmitted into the cab. This is particularly advantageous when the coat of the dog is damp as a result of rain. The dog can further be prevented from jumping over the seats of the rear row of seats and contaminating the seats and/or where applicable disturbing or distracting a driver of the vehicle. In this case, the corresponding wall 16 may be displaced into the closure position not at the instigation of the control unit 34 but instead at the instigation of the passengers, according to one embodiment.

In FIG. 6, the vehicle 54 is occupied only by the driver F. In this case, two walls 16 have been moved into the closure position at the instigation of the control unit 34, wherein a first wall 16 extends transversely to the direction of travel and extends only approximately as far as the middle of the cab, whereas a second wall 16 extends parallel with the direction of travel. The volume of the sub-portion in which the driver F is located is thereby minimized.

Figure 7:
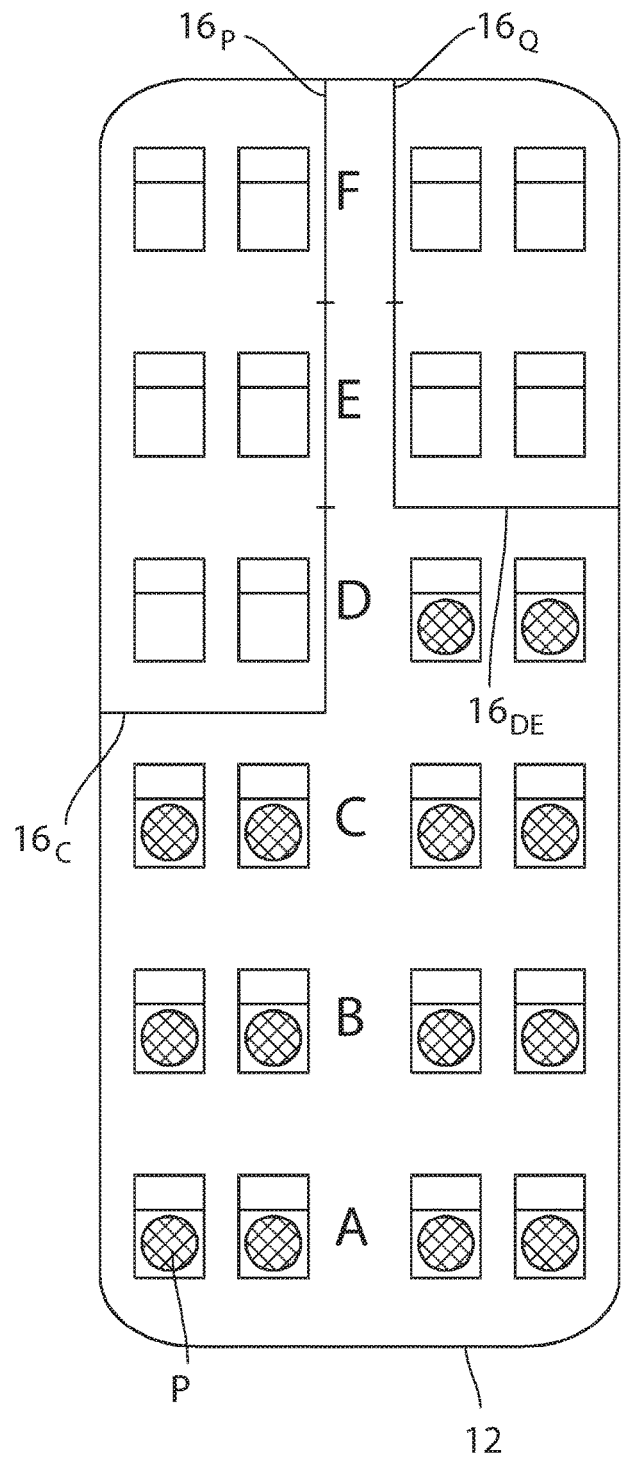
FIG. 7 is a top view of a cab of a bus, a train or an aircraft which is subdivided into a plurality of sub-portions.

FIG. 7 illustrates the cab 12 of a bus, a train, an aircraft or the like. In the embodiment illustrated, the cab has a total of six rows of seats A to F. Furthermore, the seats are arranged in such a manner that a central gangway is formed. A wall 16 is provided between each row of seats. Furthermore, there are provided respective walls $16_P$, $16_Q$ which extend perpendicularly thereto and at the sides of the central gangway, wherein for reasons of clarity only the walls 16 which are located in the closure position are illustrated.

As can be seen, only the seat rows A to C of one side and the seat rows A to D of the other side are occupied by passenger persons P. In order to minimize the volume of the sub-portion in which the persons P are located, at one side the wall $16_{CD}$ which is located between the seat row C and D and at the other side the wall $16_{DE}$ which is located between the seat row D and E have been moved into the closure position. Furthermore, the walls $16_P$, $16_Q$ which extend at the sides of the central gangway have been moved into the closure position so that they close the unoccupied seat rows of the relevant side but do not block access to the occupied seat rows, wherein the central gangway remains free, for example, in order to ensure access to the toilets or the rear exit.

An embodiment of the invention relates to a device for subdividing cabs and/or storage spaces, in particular of vehicles, into a number of sub-portions, comprising a number of deformable walls and a drive unit with which the walls can be moved between an open position, in which the walls do not subdivide the cab and/or the storage space, and a closure position, in which the walls subdivide the cab and/or the storage space into the sub-portions, wherein the walls become deformed during movement between the closure position and the open position.

In the simplest case, the walls can be moved between the open position and the closure position by a manually actuatable drive unit which has, for example, a pulley block. Otherwise, it is advantageous to operate the drive unit by a servomotor, in particular an electric motor. If the walls are in the closure position, they subdivide the cab and/or the storage space into a corresponding number of sub-portions which have a substantially smaller volume of air in comparison with the entire cab or the entire storage space. Ideally, the walls are constructed in such a manner that they completely close the sub-portions in the closure position so that no or almost no air exchange can occur between the different sub-portions. Depending on the construction of the cab and/or the storage space, however, this may sometimes not be implemented with an acceptable expenditure so that there are formed in the closure position of the walls throughopenings, via which an air exchange between the sub-portions is possible. However, this air exchange is substantially minimized in comparison with the open position of known cabs and/or storage spaces. The substantially minimized or non-present air exchange ensures that the volume which has to be temperature controlled is substantially reduced. As a result of the reduced volume, the amount of energy necessary for the temperature control also decreases at the same time, whereby the range, particularly for electric vehicles, can be increased or the fuel consumption of conventionally operated vehicles can be decreased. Furthermore, the time until the desired temperature is reached can be reduced, which increases comfort.

The possibility of reducing the air exchange between the different sub-portions can also be advantageously used in the following situations. Should an intensively odorous object (such as, for example, a cheese product) be located in the cab of a vehicle or in the storage space of an SUV or a station wagon, the reduced air exchange reduces the odor strength for the remaining passengers. The same also applies to a domestic animal, for example, a dog, which may have an intensively odorous coat, for example, in the event of damp weather. Accordingly, a sub-portion for smokers can also be provided so that as a result of the reduced air exchange already explained, the strength of the smoke which occurs during consumption of tobacco is reduced for the remaining passengers. The probability of the transmission of contagious infections to the remaining passengers can be reduced, similarly as a result of the reduced air exchange, in the event that a sick person is being transported in the cab. To this end, the sick person may be accommodated in his/her own sub-portion.

As a result of the deformability of the walls, the volume taken up by the walls in the open position can be substantially reduced in comparison with rigid walls so that the walls in the open position take up only a small amount of space. Special forms of the cab and/or the storage space, for example, projections or recesses, can be taken into consideration as a result of the deformability so that the walls can also be used in the case of relatively rugged cabins and/or storage spaces. This shows that the deformability is a decisive property which makes it possible to subdivide cabs and/or storage spaces into sub-portions, which would not be possible with rigid walls or would be possible only to a very limited extent.

In accordance with another embodiment, the walls are bendable and/or foldable. In particular in the event that the walls are foldable, the volume of the walls in the open position can be reduced particularly powerfully. The same also applies to the bendable walls, wherein the volume can be reduced more powerfully with an increasingly small bending radius. In principle, it is the case that the use of the device according to the proposal becomes easier the less structural space it requires.

In a developed embodiment, the walls may comprise bendable and/or foldable glass. Bendable and/or foldable glass is advantageous in particular for the following reasons. As a result of the transparency of the glass, the vision inside the cab and/or the storage space is also not reduced if the walls are in the closure position so that walls can also be fitted at locations where non-transparent walls would block the vision necessary as a result of provisions involving traffic safety. Since the light flow is not impaired, unlike non-transparent walls, it is unnecessary to use additional lights so that energy can also thereby be saved. Furthermore, the transparent walls ensure that the sense of space is not changed with respect to the open position or with respect to known cabs and/or storage spaces. The passengers barely notice the transparent walls and therefore do not perceive them as an impediment. Thus, there is produced almost an "invisible fence."

In one embodiment, the drive unit may have a receiving portion or cooperate with the receiving portion, wherein the walls in the open position are received completely or almost completely in the receiving portion. The receiving portion can be arranged, for example, on the roof of the vehicle or in the vehicle door or at all locations where a hollow space is present. Optionally, the receiving portion may have an opening which can be closed with a flap or the like so that, in the event that the walls are in the open position, the devices are optically virtually inconspicuous and consequently virtually do not influence the design of the cab and/or the storage space.

In another embodiment, the drive unit may have a rotatable shaft, on which the walls can be rolled up and from which the walls can be unrolled. In this embodiment, it is possible to accommodate the walls in very little space in a technically simple manner, whereby it is also possible to use the proposed device at locations where only a small structural space is available.

One embodiment is distinguished in that the drive unit comprises a number of sheathed cables with which the walls can be moved between the open position and the closure position. Sheathed cables also allow a tensile force to be transmitted over a relatively large distance to poorly accessible locations of the cab and/or the storage space. Therefore, it is possible to arrange the drive unit with substantial spacing from the walls, whereby the usually very limited structural space of a cab and/or a storage space can again be used flexibly. Furthermore, the foldable wall can be moved between the open position and the closure position similarly to a blind by use of the sheathed cable.

In accordance with another embodiment, the device has a guide device for guiding the walls inside the cab and/or the storage space. As a result of the guides, the path of the walls between the open position and the closure position is clearly predetermined, whereby the walls are prevented from becoming damaged or even destroyed during movement between the open position and the closure position. Furthermore, the guides prevent the walls from carrying out uncontrolled movements during travel, for example, as a result of acceleration and/or deceleration operations. As a result of these uncontrolled movements, the walls may also be damaged or destroyed and the driver may be distracted, whereby a danger to traffic may be produced.

One embodiment is distinguished in that the guide device has one or more redirecting rollers, with which the walls can be bent about one or more selectable angles. The redirecting rollers are particularly suitable for bypassing components of the cab such as fixings of the safety belts or armrests. It is thereby possible to close the sub-portions without relatively great technical complexity as completely as possible if the walls are in the closure position. Consequently, the air exchange can be reduced or completely prevented with the advantageous effects already mentioned above.

In another embodiment, the device may have an adjustment device, with which the redirecting rollers can be adjusted inside the cab and/or the storage space. The adjustment device increases the flexibility of the use of the device according to the proposal, for example, in the event that the front seats are adjusted longitudinally. In this case, the walls can also be adjusted in accordance with the position of the front seats so that the volume of the lower portion in which the driver and where applicable also the passenger are located can be reduced. As already explained above, a reduced volume results in a reduction of the amount of energy which is necessary for controlling the temperature of the relevant sub-portion.

In another embodiment, the drive unit can be actuated by a control unit. The control unit can be constructed in such a manner that it moves the walls into the open position or the closure position when a particularly high amount of energy can thereby be saved.

In another embodiment, the device comprises a number of sensors which record data which characterize the state of the cab, the storage space and/or the vehicle, convert the data into corresponding signals and transmit the signals to the control unit, wherein the control unit actuates the drive unit in accordance with the signals. The data which characterize the state of the cab, the storage space and/or the vehicle may be, for example, the actual and the desired temperature in the cab, the external temperature, the number of persons in the cab, the charging state of the battery of the electric vehicle, the amount of fuel still left in the tank and/or the distance to the destination input via a navigation system. Since modern vehicles have a large number of sensors, additional available data can be used. As a result of such data, the control unit can move the walls between the closure position and the open position so that a particularly great amount of energy can be saved during the temperature control.

An embodiment of the disclosure relates to a method for subdividing a cab or a storage space into a number of sub-portions with a device according to any one of the preceding embodiments, wherein the drive unit can be actuated by a control unit and the device comprises a number of sensors which record data which characterize the state of the cab, the storage space and/or the vehicle, convert the data into corresponding signals and transmit the signals to the control unit, comprising the following steps: evaluating the signals transmitted by the sensors, and controlling the drive unit in such a manner that the walls with which the volume of the sub-portions in which passengers are located is minimal are moved into the closure position.

An embodiment of the disclosure relates to a vehicle having a vehicle cab and/or a storage space comprising a device according to any one of the above-mentioned embodiments which is operated according to a method according to the embodiment set out above.

The technical effects and advantages which can be achieved with the method according to the proposal and for the vehicle according to the proposal correspond to those which have been mentioned for the present device. In summary, it may be noted that the walls allow the volume of the sub-portions to be minimized. The amount of energy for controlling the temperature of the air in this sub-portion is thereby also minimized. As a result, the range of the vehicle according to the proposal is increased, irrespective of whether a conventional vehicle, a vehicle driven with an internal combustion engine or an electric vehicle is involved. In the event that the vehicle is an electric vehicle, the technical effects and advantages described herein become evident in a particularly clear manner. In any case, a contribution to sustainable activities with energy carriers is made.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A device for subdividing a vehicle cab and/or storage space into a number of sub-portions, comprising:
   one or more deformable walls; and
   a drive unit for moving the one or more deformable walls between an open position, in which the walls do not subdivide the cab and/or the storage space, and a closure position, in which the walls subdivide the cab and/or the storage space into the sub-portions, wherein the walls become deformed during movement between the closure position and the open position, wherein the walls are bendable and/or foldable, and wherein the walls comprise bendable and/or foldable glass.

2. The device as claimed in claim 1, wherein the drive unit has a receiving portion or cooperates with the receiving portion, wherein the walls in the open position are received completely or almost completely in the receiving portion.

3. The device as claimed in claim 1, wherein the drive unit has a rotatable shaft, on which the walls can be rolled up and from which the walls can be unrolled.

4. The device as claimed in claim 1, wherein the drive unit comprises a number of sheathed cables, with which the walls can be moved between the open position and the closure position.

5. The device as claimed in claim 1, wherein the device has a guide device for guiding the walls inside the cab and/or the storage space.

6. A device for subdividing a vehicle cab and/or storage space into a number of sub-portions, comprising:
   one or more deformable walls; and
   a drive unit for moving the one or more deformable walls between an open position, in which the wall do not subdivide the cab and/or the storage space, and a closure position, in which the wall subdivide the cab and/or the storage space into the sub-portions, wherein the walls become deformed during movement between the closure position and the open position, wherein the device has a guide device for guiding the walls inside the cab and/or the storage space, and wherein the guide device has one or more redirecting rollers, with which the walls can be bent about one or more selectable angles.

7. The device as claimed in claim 6, wherein the device has an adjustment device, with which the redirecting rollers can be adjusted inside the cab and/or the storage space.

8. The device as claimed in claim 1, wherein the drive unit can be actuated by a control unit.

9. The device as claimed in claim 8, wherein the device comprises a number of sensors which record data which characterize the state of the cab, the storage space and/or the vehicle, convert the data into corresponding signals and transmit the signals to the control unit, wherein the control unit actuates the drive unit in accordance with the signals.

10. The device as claimed in claim 1, wherein the device is located on a vehicle.

11. A device for subdividing space in a vehicle into sub-portions, comprising:
    a deformable wall;
    a drive unit for moving the deformable wall between an open position in which the walls do not subdivide the space and a closure position in which the wall subdivide the space, wherein the wall becomes deformed during movement between the closure position and the open position, wherein the wall is bendable and/or foldable, and wherein the wall comprises bendable and/or foldable glass.

12. The device as claimed in claim 11, wherein the device comprises a plurality of deformable walls, and wherein each of the plurality of walls are moved by a drive unit between an open position and a closure position, and wherein each of the walls become deformed during movement between the closure position and the open position.

13. The device as claimed in claim 11, wherein the space comprises at least one of a vehicle cab and a storage space.

* * * * *